US008578122B2

(12) United States Patent
Coker et al.

(10) Patent No.: US 8,578,122 B2
(45) Date of Patent: Nov. 5, 2013

(54) INDIRECTION MEMORY ARCHITECTURE WITH REDUCED MEMORY REQUIREMENTS FOR SHINGLED MAGNETIC RECORDING DEVICES

(75) Inventors: Jonathan Darrel Coker, Rochester, MN (US); David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 182 days.

(21) Appl. No.: 13/200,418

(22) Filed: Sep. 22, 2011

(65) Prior Publication Data

US 2012/0303930 A1    Nov. 29, 2012

Related U.S. Application Data

(60) Provisional application No. 61/489,174, filed on May 23, 2011.

(51) Int. Cl.
*G06F 12/00* (2006.01)

(52) U.S. Cl.
USPC ........... 711/170; 711/100; 711/118; 711/156; 711/173; 711/221

(58) Field of Classification Search
None
See application file for complete search history.

(56) References Cited

U.S. PATENT DOCUMENTS

| 6,185,063 | B1 | 2/2001 | Cameron |
| 6,378,037 | B1 | 4/2002 | Hall |
| 6,967,810 | B2 * | 11/2005 | Kasiraj et al. ............ 360/78.04 |
| 7,603,530 | B1 | 10/2009 | Liikanen et al. |
| 2005/0071537 | A1 | 3/2005 | New et al. |
| 2007/0183071 | A1 | 8/2007 | Uemura et al. |
| 2010/0205623 | A1 | 8/2010 | Molaro et al. |
| 2010/0232057 | A1 | 9/2010 | Sanvido et al. |

OTHER PUBLICATIONS

Yuval Cassuto, et al.; Indirection Systems for Shingled-Recording Disk Drives; 26th IEEE (MSST 2010) Symposium on Massive Storage Systems and Technologies; Published May 7, 2010. http://storageconference.org/2010/Presentations/Research/15.Cassuto.pdf.

Ahmed Amer, et al.; Design Issues for a Shingled Write Disk System; 26th IEEE (MSST 2010) Symposium on Massive Storage Systems and Technologies: Research Track; Published May 7, 2010. http://storageconference.org/2010/Papers/MSST/Amer.pdf.

Ikuya Tagawa, et al.; Minimization of erase-band in shingled PMR with asymmetric writer; Journal of Magnetism and Magnetic Materials; No vol. or page given; online Dec. 2, 2010 in ScienceDirect.

* cited by examiner

*Primary Examiner* — Shawn X Gu
(74) *Attorney, Agent, or Firm* — G. Marlin Knight

(57) ABSTRACT

An indirection system in a shingled storage device is described that uses an algorithm to map LBAs to DBAs based on a predetermined rule or assumption and then handles as exceptions LBAs that are not mapped according to the rule. The assumed rule is that a fixed-length set of sequential host LBAs are located at the start of an I-track. Embodiments of the invention use two tables to provide the mapping of LBAs to DBAs. The mapping assumed by the rule is embodied in the LBA Block Address Table (LBAT) which gives the corresponding I-track address for each LBA Block. The LBA exceptions are recorded using an Exception Pointer Table (EPT), which gives the pointer to the corresponding variable length Exception List for each LBA Block. The indexing into the LBAT and the EPT is derived from the LBA by a simple arithmetic operation.

18 Claims, 5 Drawing Sheets

17 LBA Block Address Table (LBAT)

| LBA Block(0) | Physical I-Track Address |
| LBA Block(1) | Physical I-Track Address |
| ... | ... |
| LBA Block(N) | Physical I-Track Address |

Fig. 2

18 Exception Pointer Table (EPT)

| LBA Block(0) | Exception List Pointer or Null Pointer |
| LBA Block(1) | Exception List Pointer or Null Pointer |
| ... | ... |
| LBA Block(N) | Exception List Pointer or Null Pointer |

Fig. 3

INDIRECTION MEMORY ARCHITECTURE WITH REDUCED MEMORY REQUIREMENTS FOR SHINGLED MAGNETIC RECORDING DEVICES

RELATED APPLICATIONS

This application is related to commonly assigned provision patent application filed on May 23, 2011 bearing Ser. No. 61/489,174, and the benefits of this provisional application are claimed under 35 U.S.C. 119(e). A commonly assigned patent application filed on Jul. 18, 2011 bearing Ser. No. 13/135,953, which is hereby incorporated by reference, describes SMR drive embodiments with write-twice cache regions that are mentioned in the present application.

FIELD OF THE INVENTION

The invention relates to the field of data storage device architecture using indirection for mapping physical storage locations to logical addresses and more particularly to such indirection mapping used in shingle-written magnetic recording (SMR) devices.

BACKGROUND

Conventional disk drives with magnetic media organize data in concentric tracks that are spaced apart. The concept of shingled writing is a form of perpendicular magnetic recording and has been proposed as a way of increasing the areal density of magnetic recording. In shingle-written magnetic recording (SMR) media a region (band) of adjacent tracks are written so as to overlap one or more previously written tracks. The shingled tracks must be written in sequence unlike conventionally separated tracks, which can be written in any order. The tracks on a disk surface are organized into a plurality of shingled regions (also called I-region) which can be written sequentially from an inner diameter (ID) to an outer diameter (OD) or from OD to ID. The number of tracks shingled together in a region is a key performance parameter of shingled-writing. Once written in shingled structure, an individual track cannot be updated in place, because that would overwrite and destroy the data in the overlapping tracks. Shingle-written data tracks, therefore, from the user's viewpoint are sometimes thought of like append-only logs. To improve the performance of SMR drives, a portion of the media is allocated to a so-called "exception region" (E-region) which is used as staging area for data which will ultimately be written to an I-region. The E-region is sometimes referred to as an E-cache.

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or something from which a physical address can ultimately be derived.

The conventional LBA-PBA mapping for defects does not need to be changed often. In contrast, in an SMR device the physical block address (PBA) of a logical block address (LBA) can change frequently depending on write-history. For example, background processes such as defragmentation move data sectors from one PBA to another but the LBA stays the same. The indirection system for SMR is a natively dynamic system which translates host address requests to physical locations. In an SMR system, the LBA-PBA mapping can change with every write operation because the system dynamically determines the physical location on the media where the host data for an LBA will be written. The data for the same LBA will be written to a different location the next time the host LBA is updated. The indirection system provides a dynamic translation layer between host LBAs and the current physical locations on the media.

SUMMARY OF THE INVENTION

An indirection system in a storage device according to the invention uses an efficient algorithm to map LBAs to device block addresses (DBAs) based on a predetermined rule or assumption and then handles as exceptions LBAs that are not mapped according to the basic rule. The predetermined rule or assumption is that a fixed-length set of sequential host LBAs are located at the start of an I-track. The assumption will be correct for a sufficiently high percentage of LBAs (e.g. data suggests 95%+ of the drive's LBAs) so that significant reduction in the size of the storage/memory needed for the indirection address tables is possible. Embodiments of the invention use two tables serve to provide the mapping of LBAs to DBAs, but the entries can be equivalently organized into a single table. The mapping assumed by the rule is embodied in the LBA Block Address Table (LBAT) which gives the corresponding I-track address for each LBA Block. The LBA exceptions are recorded in an Exception Pointer Table (EPT), which gives the pointer to the corresponding variable length Exception List for each LBA Block. The current DBA corresponding to an LBA is found by using the Exception Pointer Table (EPT) or the LBA Block Address Table (LBAT). The indexing into the LBAT and the EPT is made efficient by deriving the index from the LBA by a simple operation such as dividing by a power of 2.

The total storage/memory needed to store the two address tables is lower than in the prior art because the LBAT, which references most of the LBAs, only includes a single I-track address for each block of LBAs. An LBA Block in an embodiment can have a relatively large number of LBAs, e.g. 64K. The Physical I-track Address is relatively small, e.g. 32 bits, and records only the starting address for the block of LBAs. A predetermined fixed-length set of sequential host LBAs are assumed to start at that address.

BRIEF DESCRIPTION OF THE FIGURES

FIG. 2 is an illustration of an LBA Block Address Table (LBAT) used in an Indirection System according to an embodiment of the invention.

FIG. 3 is an illustration of an Exception Pointer Table (EPT) used in an Indirection System according to an embodiment of the invention.

DETAILED DESCRIPTION OF THE INVENTION

Figure 1:
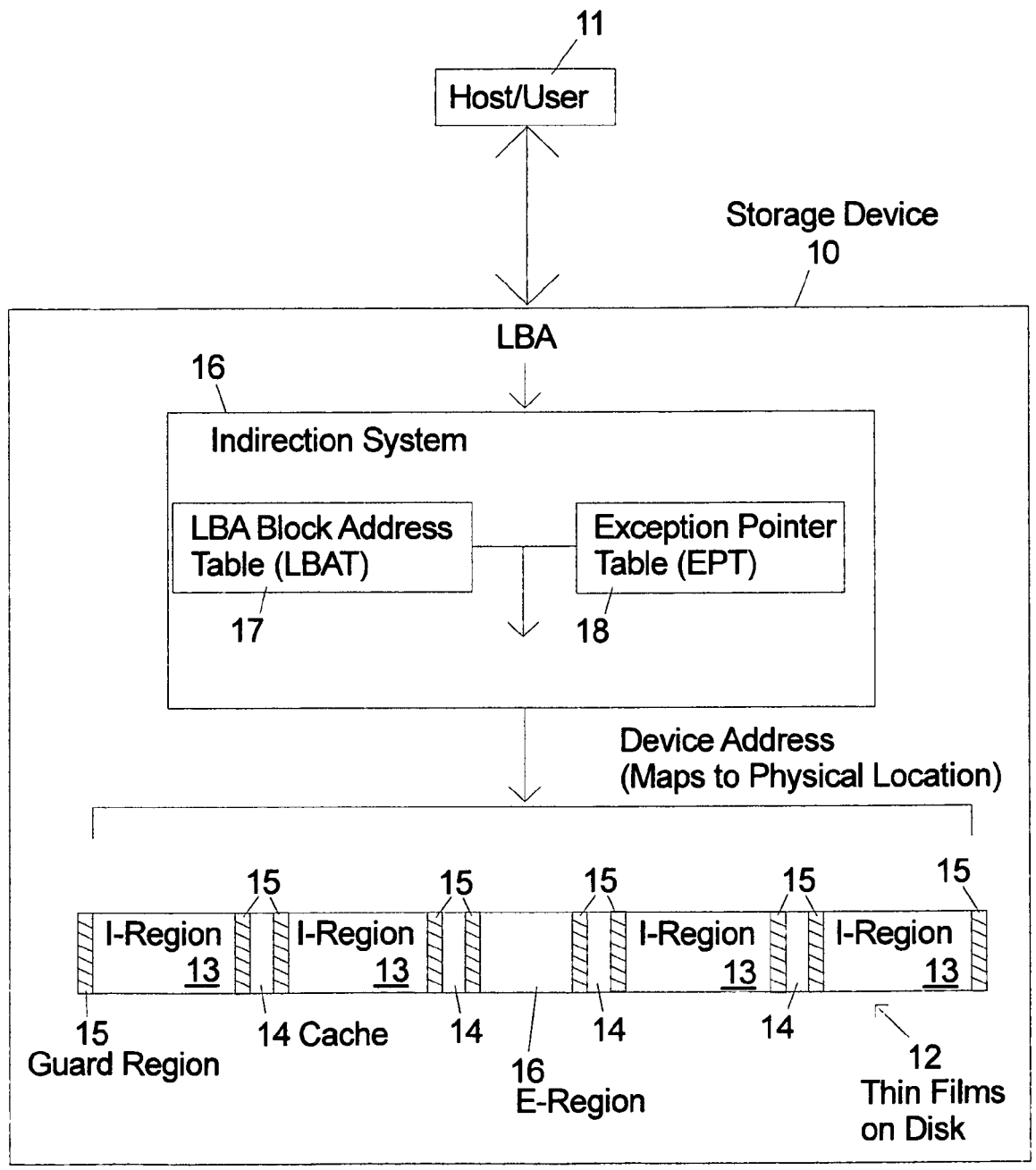
FIG. 1 is an illustration of a data storage device with an Indirection System according to an embodiment of the invention.

FIG. 1 is an illustration of a data storage device (DSD) 10 using SMR with an Indirection System 16 according to an embodiment of the invention. The host 11 can be any type of computer and can communicate with the device by any means including through a network. The term "user" will be used interchangeably with "host." Multiple hosts can also communicate with the device using prior art techniques.

The host 11 sends read and write commands that reference standard logical block addresses (LBAs). In an SMR drive according to an embodiment of the invention an LBA can be assigned to an E-region, an I-region, or Write-twice Cache region which complicates the task of indirection mapping. These regions can be mapped into a single physical address space that is not physically contiguous. This can take the form of a simple translation using the start of each region and its length.

Thin films 12 are magnetic thin film coatings, which typically are deposited on both upper and lower surfaces of a hard disk (not shown) and a device can also have multiple disks. The films 12 are shown in FIG. 1 in cross section view. In a plan view, the regions are a plurality of concentric circular bands. The magnetic thin films are formatted for use in an SMR architecture and in this embodiment include E-region 16, I-regions 13, write cache regions 14 (also called write-twice cache regions), and guard regions or bands 15. A device can have multiple E-regions on a single disk surface.

The Indirection System 16 translates the LBAs from the host commands into device block addresses (DBAs) or equivalently Device LBAs for internal use by the device. A DBA as used herein is not necessarily a physical address, but instead an intermediate representation used by the device. For example, a DBA can be logically adjusted to account for defects. The term device block address (DBA) is an internal address that the device uses in a particular context to identify a physical storage location on the media regardless of what type of region it is in. When used without a qualifier herein the term LBA refers to the host LBA.

The Indirection System 16 can, for example, be implemented as a functional component in the controller portion (not shown) of the DSD 10. The Indirection System 16 functions according to the prior art except as described herein, and aspects of the Indirection System that perform prior art functions are not shown. The current DBA corresponding to an LBA is found by using the LBA Block Address Table (LBAT) 17 or the Exception Pointer Table (EPT) 18. Collectively these two tables serve to provide the mapping of LBAs to DBAs as will be described more fully below.

The indirection system (controller) 16 keeps track of where data for each host LBA is currently stored in the device's various regions using the LBAT 17 and EPT 18. The total memory needed to store the two address tables is kept low because the LBAT, which references most of the LBAs, only includes a single I-track address for each block of LBAs.

FIG. 2 is an illustration of an LBA Block Address Table (LBAT) 17 used in an Indirection System according to an embodiment of the invention. As shown in FIG. 2, the LBAT only contains a single Physical I-track Address for each LBA Block. An LBA Block in an embodiment can have a relatively large number of LBAs, e.g. 64K. The Physical I-track Address is relatively small, e.g. 32 bits, and records only the starting address for the block of LBAs. A predetermined fixed-length set of sequential host LBAs are assumed to start at that address. The starting address for the block of LBAs is preferably constrained to be start of an I-track. The set of LBAs are sequential as viewed by the host and device.

The Indirection System algorithm of the invention is based on a rule and exceptions. The basic rule (assumption) is that a fixed-length set of host LBAs that are sequential as viewed by the host and device are located at the start of an I-track. The basic assumption will be accurate for a sufficiently high percentage of LBAs (e.g. data suggests 95%+ of the drive's LBAs) so that significant reduction in the size of the memory needed for address tables is possible.

As shown in the embodiment in FIG. 2, each consecutive block of LBAs is mapped to a starting address for an I-track. The consecutive ordering of the blocks of LBAs and the block size are assumed in the creation of the LBAT. So the size of the blocks of LBAs is predetermined (e.g., 64K LBAs) and the first entry in the LBAT is the starting address for an I-track for the first block of LBAs (LBA Block(0)). The organization of the LBAT is preferably part of the design of the device and once determined should not change. However, the entries in the LBAT specifying the I-track can be changed if needed as the device operates. It follows that I-track addresses for adjacent LBA Blocks do not need to refer to adjacent I-tracks.

Specific LBAs within each block of LBAs can be referenced by an offset from start of the block, which is the start of an I-track. Note that I-tracks can physically wrap at the end of an I-region. These I-tracks still have one a single LBAT entry. A check is made to see if an I-track would extend past the end of the current I-region and a wrap condition is used in calculating the DBA for any request. Therefore, specific LBAs within each I-track can be identified by the I-track number, and its offset from the starting LBA of that specific I-track. The abbreviated LBA addressing results in reduced memory requirements for the address tables. The indirection algorithm is most efficient when sequential LBAs of an I-track correspond to sequential DBAs on the disk surface.

The device handles LBAs that are not written in sequence as part of an entire block of LBAs as exceptions to the default rule or assumption. FIG. 3 is an illustration of an Exception Pointer Table (EPT) 18 used in an embodiment of the invention. For each block of LBAs, the device maintains a variable length Exception List, which can be empty. For fast lookup a fixed size table of pointers is maintained with pointers to the non-empty Exception Lists. A null pointer is used for empty Exception Lists, i.e. those I-tracks which are completely intact with sequential LBAs. The Exception Pointer Table (EPT) 18 has the same number of entries as the LBA Block Address Table (LBAT) 17 and can be indexed the same way, as will be discussed further below. Although the LBAT 17 and EPT 18 are shown as two separate tables each with a single column, as equivalent arrangement could have one table with two columns.

Figure 4:
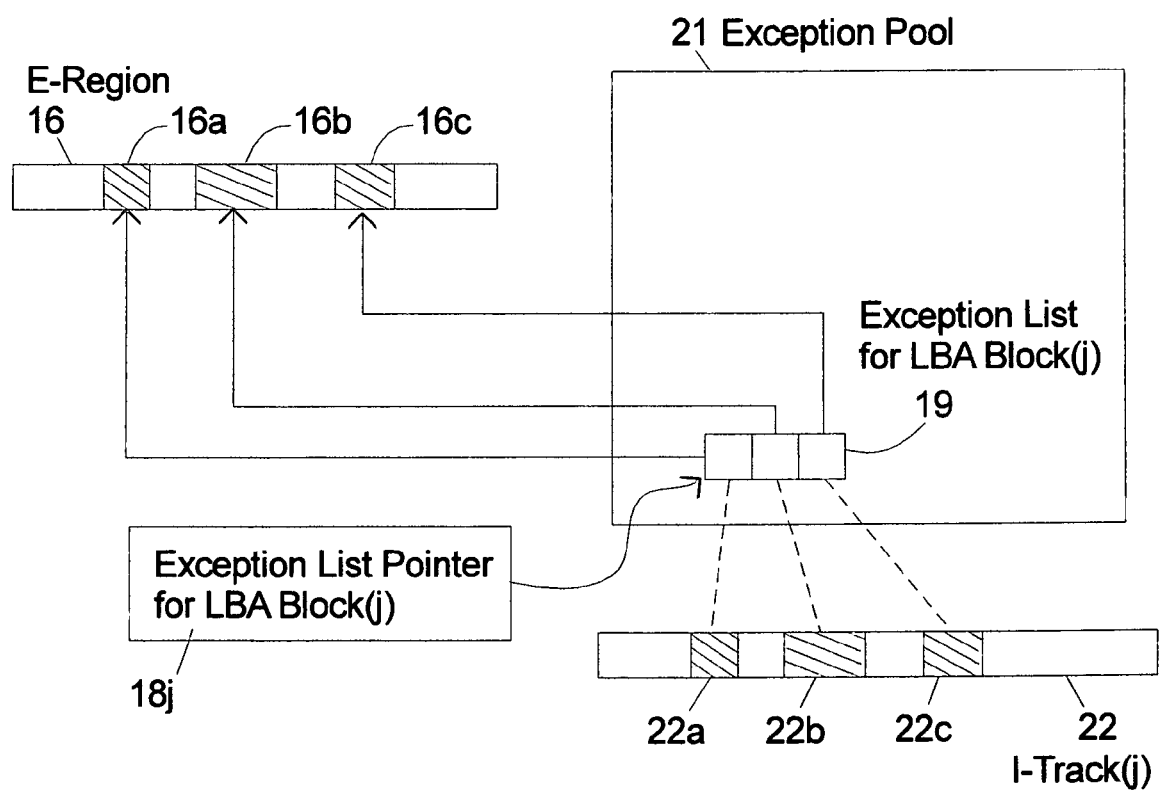
FIG. 4 is an illustration of an example of an Exception List pointed to by an entry in an Exception Pointer Table (EPT) used in an Indirection System according to an embodiment of the invention.

FIG. 4 is an illustration of an example of an Exception List for LBA Block(j) 19 pointed to by an Exception List Pointer for LBA Block(j) 18*j* which is an sample entry in an Exception Pointer Table (EPT) 18 used in an embodiment of the invention. The set of Exception Lists are preferably stored in a dynamically managed storage area called the Exception Pool 21 in an embodiment of the invention. The Exception List for LBA Block(j) 19 has three entries, which point to data blocks 16*a-c* that are currently stored in an E-region 16. The entries in the Exception List 19 cover data blocks 22*a-c*, which were previously mapped to LBAs in I-track(j) 22 but which have been replaced by 3 non-sequential write commands received from the host for these LBAs. To further illustrate this example, assume that the first host command causing an exception for I-track(j) was received to write 8 consecutive LBAs that were previously written in area 22a, which is at offset 0x0100 from the start of the track. Due to the shingled arrangement of I-tracks, none of the sectors in I-track(j) can be updated in-place. Therefore, the device takes the following actions (not necessarily in this order):

- write the new data for 8 consecutive LBAs in the E-region 16 starting at an available DBA or Drive-LBA (, e.g. 0x18F01240).
- create an Exception List with 1 entry with offset, length and DBA fields in the Exception Pool 21, for example:
  Offset: 0x0100
  Length: 0x0008
  DBA: 0x18F01240.
- set pointer in EPT for the LBA Block(j), which corresponds to I-track(j), to the address of the new Exception List.

When additional commands change the data in the LBAs that originally correspond to areas 22b, 22c, then the system adds the second and third exceptions for these updates to the previously created Exception List 19. When each new entry is added, the Exception List is preferably sorted by offset from the start of the I-track to provide for efficient searching of the list. The old data for the LBAs that have rewritten by the host is left on the I-track, but is not used. The principles of operation are the same for write commands that reference LBAs that are already contained in an Exception List. The device has to update the Exception List to record the new LBAs, which can involve invalidating one of more existing indirection entries.

As LBAs are written by the host, the Exception Lists will tend to grow, but the exceptions in the lists can be merged back into a newly written I-track as part of a defragmentation process. Some or all of the exceptions for the tracks in an I-track region can be reset by the defragmentation process which rewrites the entire I-track region sequentially including the updated LBAs that were initially recorded as exceptions. Additionally, to reduce the space needed for the Exception Lists, highly fragmented I-tracks can be recombined with their exceptions and rewritten into either the I-region or E-region. This "logical" defragmentation process is accomplished by gathering randomly written data and rewriting it sequentially. Thus, an entire I-track could be written in the E-region and the corresponding Exception List would be short, with perhaps a single entry if the length field was large enough to cover it.

The data for exception LBAs, which have been written non-sequentially, can be located in an E-region as in the example above, but it can also be located in a cache region on the disk. In alternative embodiments the cache region on the disk can be a Write-Twice Cache (WTC) region or a Hot Cache region. In alternative embodiments some of the regions that could otherwise be WTCs are used as Hot Cache regions. In embodiments using Hot Cache regions, the defragmentation process might be designed to not merge the exceptions in the Hot Cache back into the sequential I-track because that would eliminate the benefit of the cache at least temporarily.

For the E-region(s), the indirection system can use either abbreviated LBAs according to the invention or standard format: LBA:DBA mapping.

On each host read command, which can be for a block of LBAs, the Indirection System uses the EPT and the LBAT to determine where each of the LBAs is located, and if any part of the request is contained in one or more exceptions. The LBAs for the read request are retrieved from the potentially various regions and sent to the host as a block.

Indexing the LBAT and EPT:

The LBAT and EPT are preferably structured so that the LBA Block index, which is used to retrieve a Physical I-track Address and the Exception List Pointer, is derived by performing a simple, fast calculation or operation using the LBA from the host command. Preferably the LBA is divided by a power of 2 to derive the index. For example, if each LBA Block has 64K (i.e. $2^{16}$) LBAs, then dividing by 64K (or equivalently a 16-bit logical shift to the right) gives the I-track entry number in the LBAT in which that LBA is mapped based on the basic rule. (Note: To get to the byte address in the LBAT, the entry number in the LBAT is multiplied by the number of bytes per entry, e.g. 4 bytes.) The LBA Block(0) entry as shown in FIG. 2 would correspond to LBAs 0 through 64K−1. In this example, the lower 16 bits of the LBA are the offset within the block.

The size of each Physical I-track Address (PIA) entry in the LBAT can be less than or equal to 32 bits regardless of the number of the device's capacity. The Physical I-track Address is the starting point of an I-track and can be restricted to a multiple of native blocks to ensure that only 32 bits are necessary. For example, in a 16 TB drive, with 512 byte sectors, 32-bit address can only resolve 2 TB, but by restricting the Physical I-track Address to start on 4K boundaries the full 16 TB can be addressed. But smaller offsets can be used if I-tracks have a linear mapping to I-regions. I-track granularity determines the I-track Address Table size, but also affects indirection lookup overhead and the EPT entry size. An exemplary embodiment with 64K LBAs per I-track could have an LBA Block Address Table (LBAT) size requirement of 256 KB per 1 TB of storage capacity. The 256 KB would increase to 288 KB with 8:1 ECC protection. The storage requirements for the EPT can be the same as for the LBAT.

The Exception List for an I-track is a variable length data structure. The set of Exception Lists can generally be managed using standard data processing techniques. An exemplary embodiment uses a dynamic Exception Pool 21. When an update to an Exception List is required (because of a host write command) the existing Exception List, if one exists, is merged with the new entry or entries into an SRAM Buffer and the entries are sorted into the required order before being written back to free space in the Exception Pool. The SRAM is used as work area since final number of exceptions unknown before hand. The Exception List Pointer for the LBA Block/I-track is updated to point to new Exception Pool location. The space for the previous (old) Exception List in the Exception Pool is freed for other use. An Exception List can be updated in-place when only the DBA is updated, for example, when destaging from Write-Twice cache to an E-region) or length is increased during a sequential write.

An Exception List for an I-track on which an LBA Block is stored is preferably sorted by the offset from the start of the I-track. This structure allows for fast lookup of $O(\log_2 N)$, where N is the number of entries in the list. The Entries do not overlap and can be split or deleted by insertions into the list. Long writes (e.g. >256 blocks) can be split into multiple Entries, because the size of each Exception List can grow as needed.

An exemplary Exception List Entry is 8 bytes long including 16 bits for an offset field, 16 bits for a length field, and a 32-bit Exception DBA (EDBA). The 16-bit offset field provides full addressability of 64 k LBAs in an I-track. The 32-bit EDBA is sufficient by constraining exception start granularity.

In alternative embodiments the EDBA can be further constrained by excluding the need to address I-tracks. In this embodiment the EDBA is constrained to only apply to regions where the exception LBAs are stored, e.g. E-region, Write-Twice Cache and Hot Cache. In this case it is possible that 6 or 7 byte Deltas could be used with a 8-bit length field and/or 24-bit EDBA.

Figure 5:
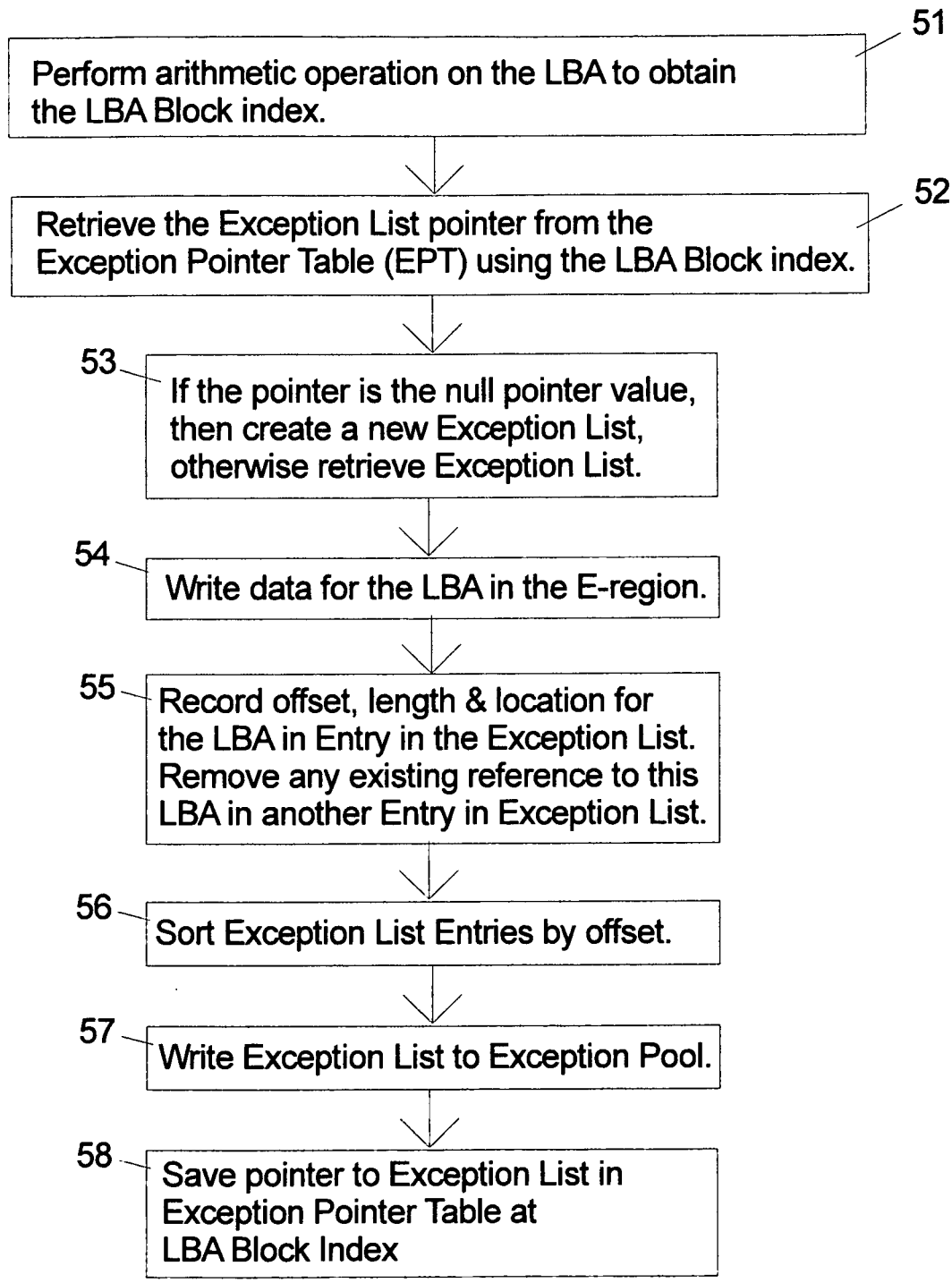
FIG. 5 is an illustration of an example of the execution of a write command by data storage device according to an embodiment of the invention.

FIG. 5 is an illustration of an example of the execution of a write command by data storage device according to an embodiment of the invention. A write command received from a host specifies at least one LBA and in this example it is assumed that a single LBA is specified. An arithmetic operation is performed on the LBA to obtain an LBA block index for the LBA 51. The pointer for the corresponding Exception List is retrieved from the Exception Pointer Table using the LBA block index 52. If the pointer is the null pointer value, then a new Exception List is created, otherwise the existing Exception List is retrieved 53. The data for the LBA is written at a selected location, e.g. in the E-region 54. An entry is added to the Exception List identifying the LBA by the offset within the LBA Block, a length, which is 1 in this case, and giving the selected storage location 55. Note that if there is a pre-existing entry in the Exception List that includes the LBA, then this reference to the LBA must be removed, which may require several actions such as splitting the pre-existing entry into two new entries. If it is a single entry that references only the one LBA, then the entry can simply be deleted. If the reference to the LBA is part of block of LBAs, then the entry might be edited or divided as necessary to remove the reference to the LBA and maintain the exception entries for the other LBAs.

The entries in the Exception List are sorted by the offset 56 to allow rapid searching. The Exception List is written to storage 57, e.g. in space dynamically allocated in the Exception Pool. A pointer to Exception List's storage location is recorded in the Exception Pointer Table using the LBA block index 58. The order in which some of these actions are taken can vary in different embodiments.

Figure 6:
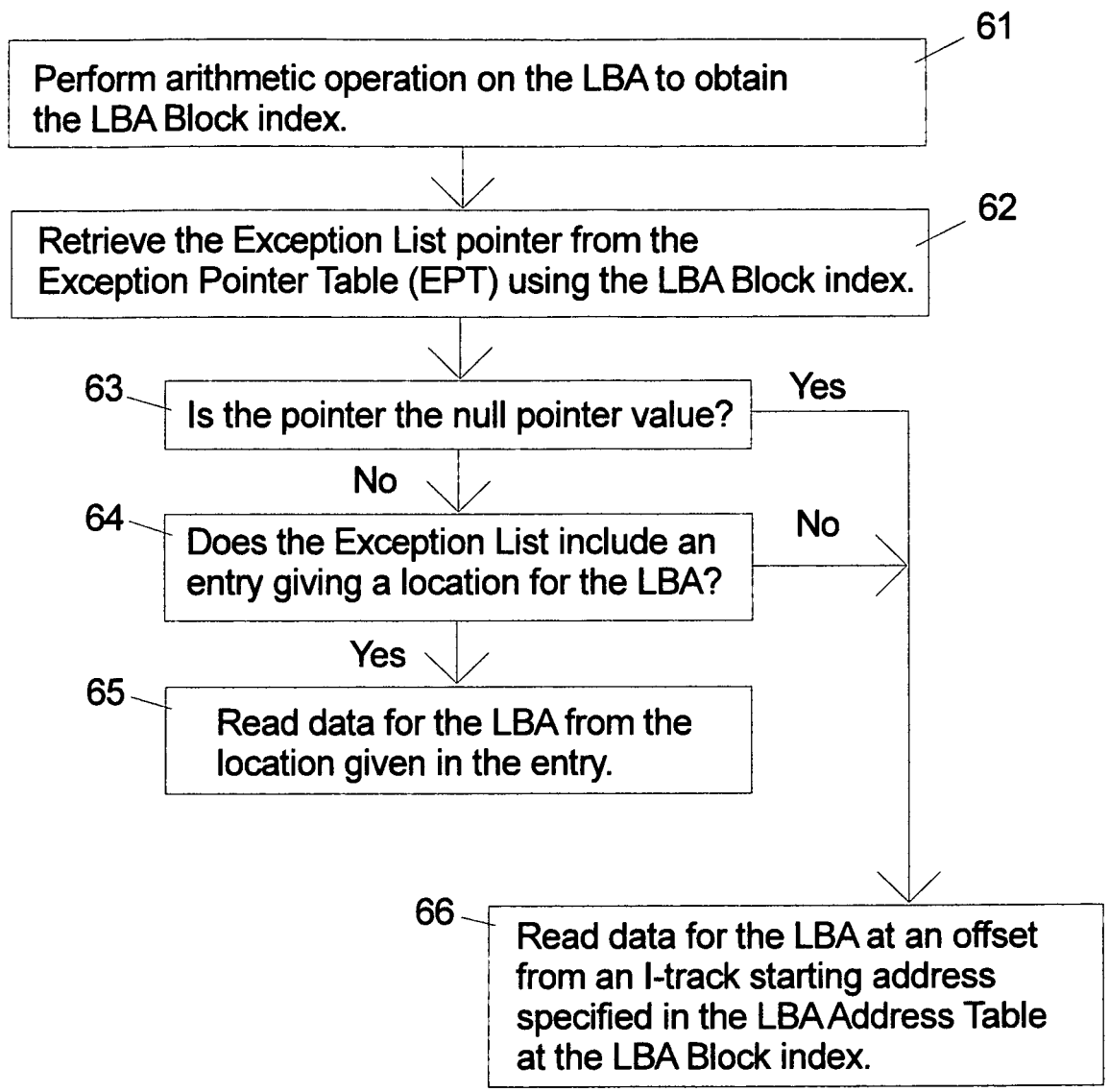
FIG. 6 is an illustration of an example of the execution of a read command by a data storage device according to an embodiment of the invention.

FIG. 6 is an illustration of an example of the execution of a read command by a data storage device according to an embodiment of the invention. A read command received from a host specifies at least one LBA and this example assumes that a single LBA is given. An arithmetic operation is performed on the LBA to obtain an LBA block index corresponding to the LBA 61. The pointer for an Exception List is retrieved from the Exception Pointer Table using the LBA block index 62. If the pointer is the null pointer value 63, then the data for the LBA is read from an I-track specified in an LBA Address Table at the LBA block index 66. The data sector for the LBA will be offset from the start of the I-track as indicated by the LBA. In this case the data for the LBA follows the assumed basic rule. Once the data is read, it is sent to the host in the standard way.

If the pointer is not the null pointer value, then the Exception List is searched for entries giving a location of the LBA 64, and if an entry giving the location of the first LBA is not found, then the data is read from the I-track 66 as described above. If an entry giving the location of the first LBA is found in the Exception List, then the data for the LBA is read from the specified location 65, which can be in an E-region or cache region in this embodiment. Once the data is read, it is sent to the host in the standard way.

If the read command specifies a set of LBAs, the reading process is essentially the same for each LBA, but some steps do not need to be repeated for a series of LBAs that are all in the same LBA Block and, therefore, are covered by the same Exception List pointer. For example, if the pointer is null, then all of the LBAs in that LBA block are found on the I-track, and it is not necessary repeatedly check the pointer.

As used herein, a region is a set of contiguous concentric tracks in thin film magnetic media on a disk surface. I-regions are shingled user-data areas. An E-region is an exception region that includes data that is an exception to the general rule. The E-regions include updated LBAs that were previously written in sequential shingled I-regions and could not be overwritten in place. The old sectors in I-region become holes that are eventually recovered by the defragmentation process. E-regions can be shingled or non-shingled and there can be one or more per disk-media surface.

WTC-regions (write-twice cache regions) are relatively small bands of tracks generally between I-regions that are used for write caching or other opportunistic data storage. In devices with WTC-regions user-data can be written to WTC-regions first, then to either E-region or I-track region. Writing within each WTC-region can be shingled or unshingled. WTC-regions and I-tracks are set up in an alternating series interrupted occasionally by E-regions (e.g., there can be roughly equal numbers of WTC-regions and I-regions with fewer E-regions). When write-caching user-data to a WTC-region, the nearest WTC-region is preferably used, regardless of where the data will be eventually written. The nearest WTC-region is defined as the one with shortest seek time, which can be on different disk-media surface.

The invention claimed is:

1. A shingled data storage device having an Indirection System comprising:
   a first set of table entries recorded in a memory in the Indirection System forming a Logical Block Address Table (LBAT) in which each entry maps a block of consecutive Logical Block Addresses (LBAs) to an I-track address; and
   a set of Exception Lists recorded in the memory in the Indirection System specifying storage locations for LBAs that are not located on an I-track specified in the Logical Block Address Table for a corresponding block of consecutive LBAs.

2. The device of claim 1 wherein the set of Exception Lists are referenced through a second set of table entries forming an Exception Pointer Table in which each entry is a null pointer or a pointer to an Exception List for a corresponding block of consecutive LBAs.

3. The device of claim 1 wherein the entries forming the Logical Block Address Table (LBAT) are arranged so that an index for an entry in the LBAT corresponding to a particular LBA is derived by performing an arithmetic operation on the particular LBA.

4. The device of claim 3 wherein the arithmetic operation includes dividing by a power of 2.

5. The device of claim 2 wherein an index for a selected entry in the LBAT is equal to an index for a corresponding entry in the Exception Pointer Table.

6. The device of claim 1 wherein I-track addresses in the LBAT are restricted to predetermined boundaries that are a power of 2.

7. The device of claim 1 wherein the Exception Lists are stored in a dynamically managed Exception Pool storage area.

8. The device of claim 1 wherein a size of a block of consecutive LBAs for each entry in the LBAT is a power of 2.

9. The device of claim 1 wherein each Exception List includes one or more entries comprising an offset value specifying a first LBA's location within a block of LBAs, a length and a storage location where the first LBA is stored.

10. A method of operating shingled data storage device comprising:
receiving a read command from a host specifying at least a first Logical Block Address (LBA), the first LBA being within a first LBA Block which is one of a plurality of equal sized LBA Blocks of sequential LBAs; and
searching an Exception List for the first LBA Block for an entry giving a storage location of the first LBA, and if an entry giving the storage location of the first LBA is found in the Exception List, then reading data for the first LBA from the storage location, and if an entry giving the storage location of the first LBA is not found, then reading data for the first LBA from an I-track mapped to the first LBA Block.

11. The method of claim 10 wherein an I-track address for each LBA Block is specified in an entry in LBA Address Table and reading data for the first LBA from the I-track mapped to the first LBA Block further comprises finding the I-track in LBA Address Table using an LBA block index corresponding to the first LBA derived by performing an arithmetic operation on the first LBA to obtain an LBA block index corresponding to the first LBA.

12. The method of claim 10 further comprising retrieving, before the step of searching, a pointer for the Exception List from an Exception Pointer Table using an LBA block index corresponding to the first LBA, the Exception Pointer Table having an entry for each of the equal sized blocks of sequential LBAs, the LBA block index corresponding to the first LBA being derived by performing an arithmetic operation on the first LBA to obtain the LBA block index corresponding to the first LBA.

13. A method of operating shingled data storage device comprising:

receiving a command to write data at a specified LBA, the specified LBA being within one of a plurality of predetermined equal sized blocks of sequential LBAs;
performing an arithmetic operation on the specified LBA to obtain an LBA block index corresponding to the specified LBA;
retrieving a first pointer to an Exception List from an Exception Pointer Table using the LBA block index, the Exception Pointer Table having an entry for each of the predetermined equal sized blocks of sequential LBAs;
retrieving the Exception List using the first pointer;
writing the data at a first selected storage location;
adding an entry to the Exception List identifying the specified LBA and the first selected storage location;
writing the Exception List to a second storage location; and
recording a second pointer to the second storage location in the Exception Pointer Table at the LBA block index.

14. The method of claim 13 further comprising creating a new Exception List when the first pointer is a null value.

15. The method of claim 13 further comprising sorting the Exception List in order of an offset value for an LBA which specifies an offset of an LBA within the blocks of sequential LBAs.

16. The method of claim 13 wherein performing an arithmetic operation further comprises dividing by a power of 2.

17. The method of claim 13 further comprising merging all LBAs in a selected Exception List into a block of sequential LBAs during a rewriting process and setting an entry in the Exception Pointer Table to a null pointer value.

18. The method of claim 17 wherein the blocks of sequential LBAs are written to an E-region.

* * * * *